Feb. 11, 1941.　　　　E. J. DILLMAN　　　　2,231,209
CONTROL DEVICE
Filed Aug. 29, 1936　　　　6 Sheets-Sheet 2

INVENTOR
Earnest J. Dillman
BY Andrew K. Foulds
his ATTORNEY

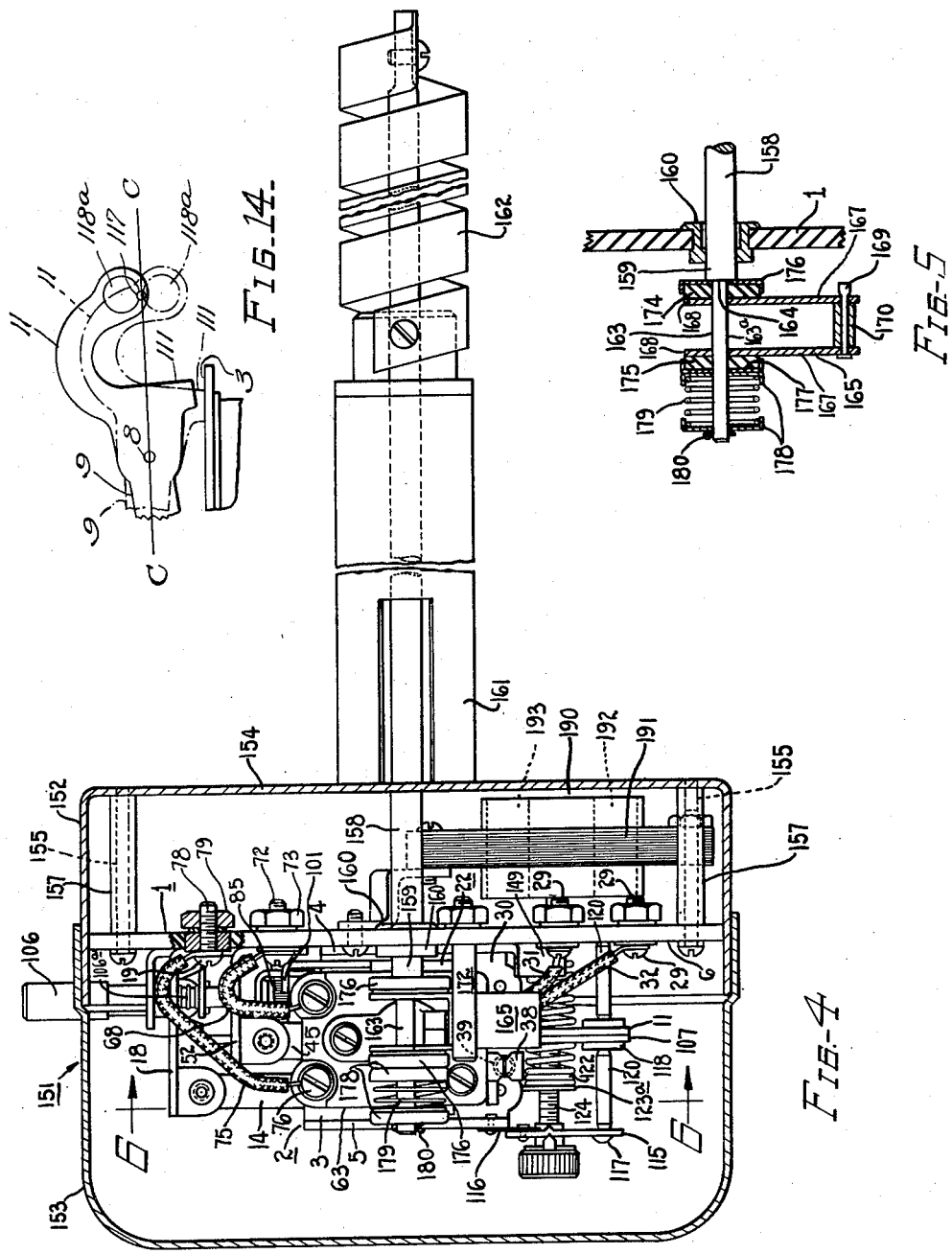

Feb. 11, 1941. E. J. DILLMAN 2,231,209
CONTROL DEVICE
Filed Aug. 29, 1936 6 Sheets-Sheet 4

INVENTOR
Earnest J. Dillman
BY Andrew K. Foulds
his ATTORNEY

Feb. 11, 1941.  E. J. DILLMAN  2,231,209
CONTROL DEVICE
Filed Aug. 29, 1936  6 Sheets-Sheet 5
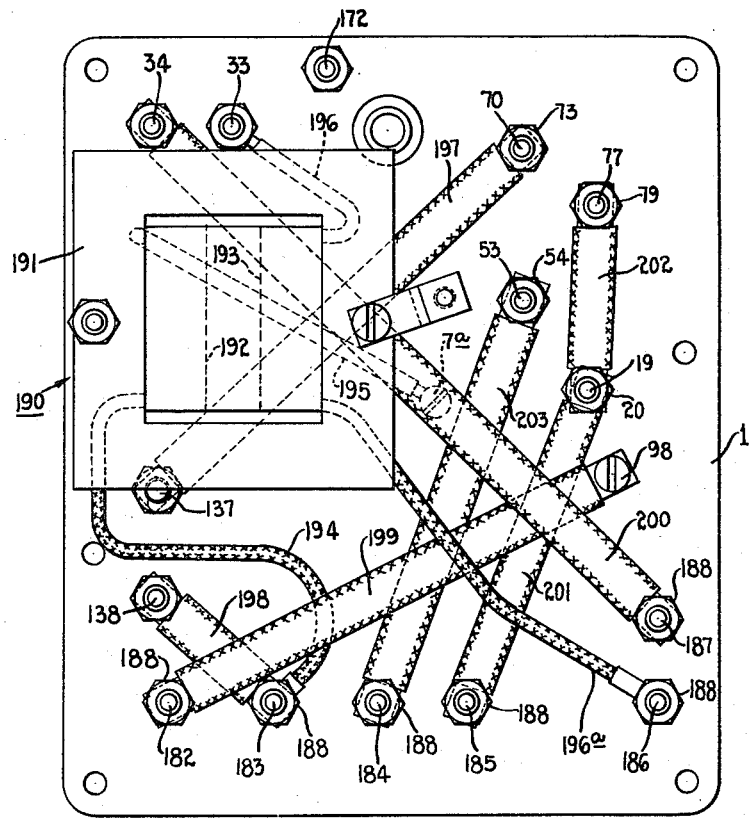
Fig.-8
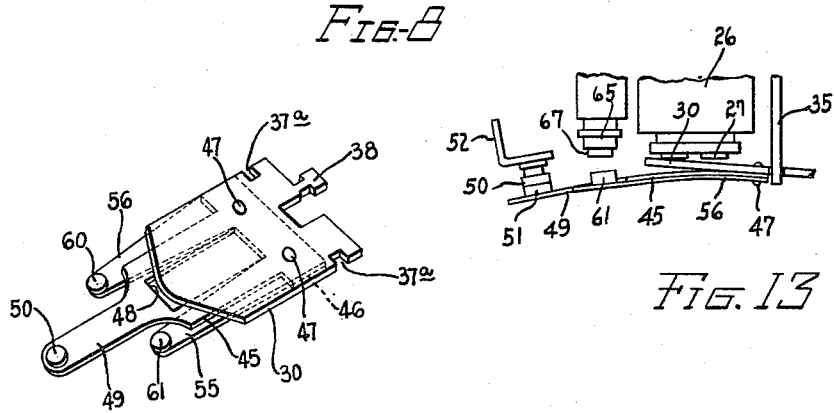
Fig.-9
Fig. 13
INVENTOR
Earnest J. Dillman
BY
Andrew K. Foulds
his ATTORNEY Feb. 11, 1941.  E. J. DILLMAN  2,231,209
CONTROL DEVICE
Filed Aug. 29, 1936  6 Sheets-Sheet 6

INVENTOR
Earnest J. Dillman
BY
Andrew K. Foulds
His ATTORNEY

Patented Feb. 11, 1941

2,231,209

UNITED STATES PATENT OFFICE 2,231,209

CONTROL DEVICE

Earnest J. Dillman, Detroit, Mich., assignor to Detroit Lubricator Company, Detroit, Mich., a corporation of Michigan Application August 29, 1936, Serial No. 98,466

22 Claims. (Cl. 158—28)

My invention relates generally to control devices and more particularly to control devices for controlling the operation of heating apparatuses.

One of the objects of my invention is to provide a new and improved control device for controlling the operation of a heating apparatus.

Another object of my invention is to provide a control device having novel safety means operable for stopping the supplying of fuel to a heating apparatus in the event of failure of combustion.

Another object of my invention is to provide a control device having a new and improved arrangement of the operating parts thereof.

Another object of my invention is to provide a control device having new and improved snap-acting mechanism.

The invention consists in the improved construction and combination of parts, to be more fully described hereinafter, and the novelty of which will be particularly pointed out and distinctly claimed.

In the accompanying drawings, to be taken as a part of this specification, I have fully and clearly illustrated my invention, in which drawings—

Fig. 4 is a top plan view of my device with the casing shown in cross section;

Fig. 5 is a view shown in cross section of certain parts of my device;

Fig. 8 is a rear view of my device;

Fig. 9 is a detail view in perspective showing the preferable arrangement of a plurality of switch blades employed in my device;

Fig. 13 is a fragmentary view shown in side elevation of switch means employed in my device, and Fig. 14 is a detail view showing respectively in full and in dash-dot lines the two overcenter positions of certain lever mechanism.

Figure 1:
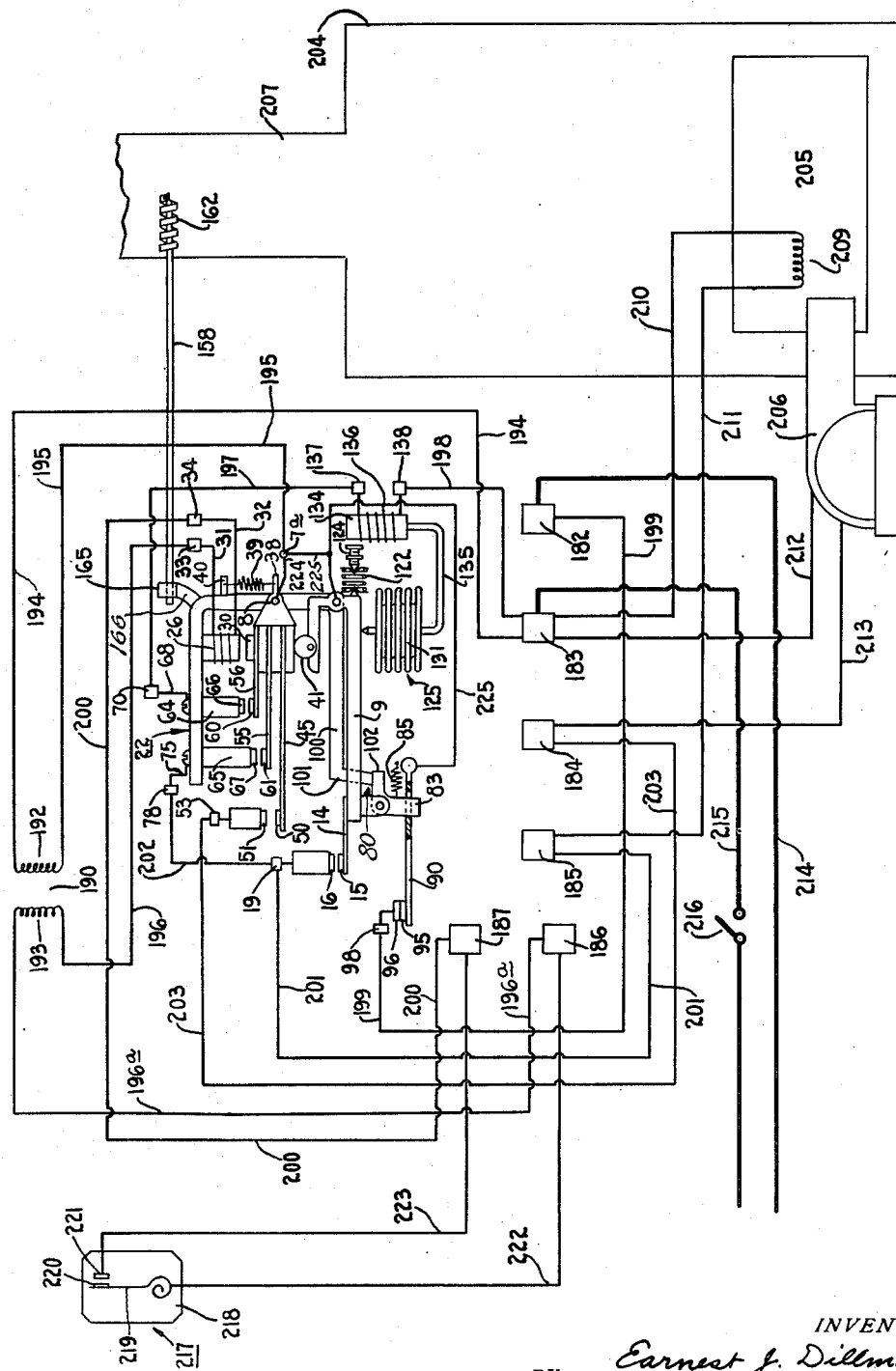
Figure 1 is a diagrammatic view of a heating system and my control device therefor.

Referring to the drawings by characters of reference the numeral 1 designates in general a supporting member or mounting board on which my control device is mounted, the board 1 being formed of electric insulating material and preferably being of rectangular shape. Rigidly mounted on the board 1 there is a metallic supporting member, or bracket 2, preferably of channel form having a substantially horizontally disposed base portion 3 from which extend upturned, substantially parallel flanges or sides 4 and 5 that extend along the side edges of the base 3. The channel-shaped supporting member 2 is preferably mounted on the board 1 substantially centrally thereof, with the outer face of the upwardly extending side flange 4 disposed toward and lying flat against one side 6, or front face of the board. The board 1 and flange 4 may be provided with aligning apertures to receive screws 7 and 7ª that may thread into the flange 4 from the back of the board 1 for rigidly securing the supporting member 2 to the board 1. The screw 7ª, in addition to securing the channel-shaped support 2 to the board 1, also serves as a binding post for a lead wire of a circuit to be hereinafter described.

Figure 6:
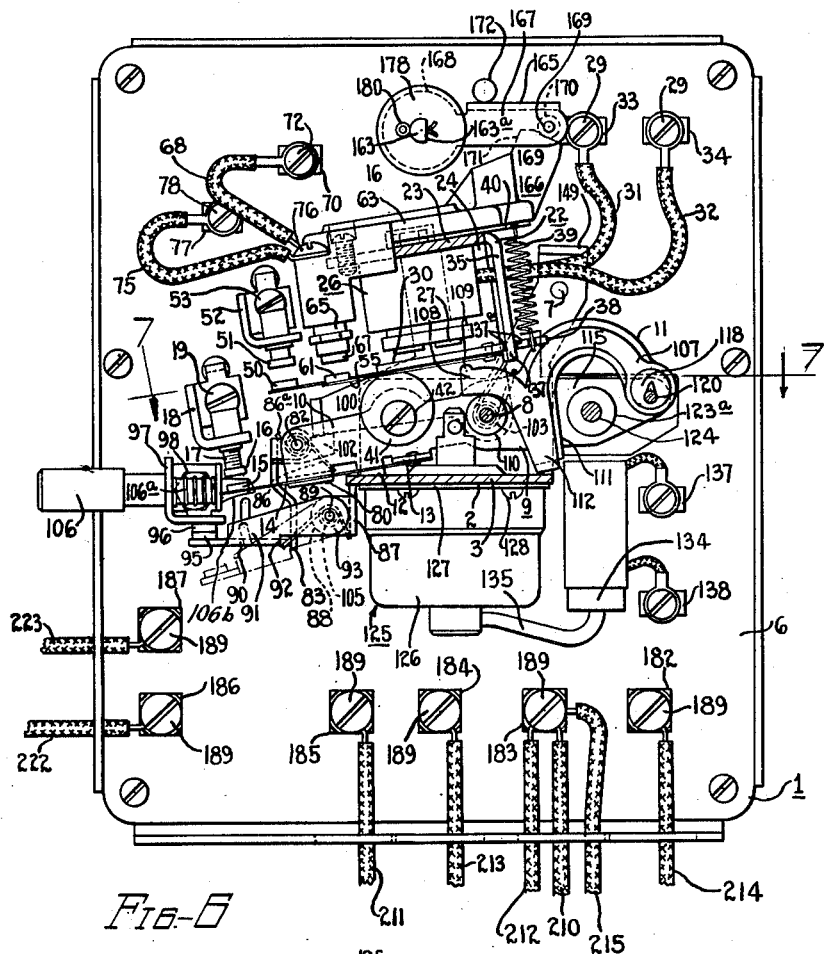
Fig. 6 is a view similar to Fig. 2 but taken along the line 6—6 of Fig. 4.
Figure 7:
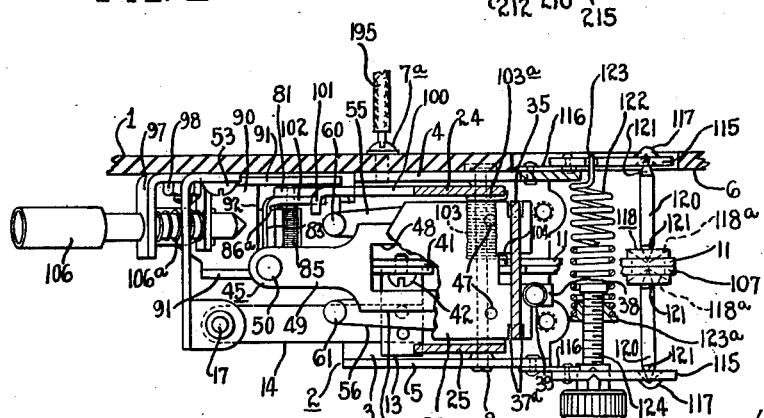
Fig. 7 is a view in section taken substantially along the line 7—7 of Fig. 6.

A shaft or pin 8 is supported by the channel-shaped supporting member 2, the opposite ends of the shaft preferably being secured in and to the parallel side flanges 4 and 5 of member 2 in such a manner that the shaft 8 is prevented from rotating. A main lever member 9, which may be formed of sheet metal, is pivotally supported, at a point substantially midway between its ends, on the shaft 8 and has substantially oppositely directed lever arms 10 and 11. The lever member 9 is positioned substantially midway between the side flanges 4 and 5 and extends parallel and longitudinally thereof with end portions of the lever arms 10 and 11 preferably extending beyond the opposite ends of the supporting member 2. The lever arm 10 is preferably formed having a downwardly directed extended portion 12 for abutment with the upper surface of the base 3 of the supporting member 2 to limit counterclockwise movement of lever member 9, as seen in Fig. 6. Between the stop member 12 and the fulcrum of lever arm 10, the lever arm 10 is formed at its lower edge having an outturned flange portion or tab 13 to which is secured one end of a flexible blade 14 that extends longitudinally of lever arm 10. Rivets or other suitable means may be employed for securing the blade 14 to the tab 13 of lever arm 10. The free end of the blade 14 terminates at a point beyond the end of the lever arm 10 and carries an upwardly facing contact member 15 for cooperation with a downwardly facing contact member 16 for controlling an electric circuit to be hereinafter described. The contact member 16 may be carried on the end of a threaded post, or screw 17 that adjustably screw threads into a bracket 18 which is mounted on and projects forwardly from the face of the insulating board 1. The bracket 18 is secured to the board 1 by a screw 19 and a nut 20, see Fig. 8, the screw 19 also serving as a binding post for a wire of a circuit to be hereinafter described.

Figure 3:
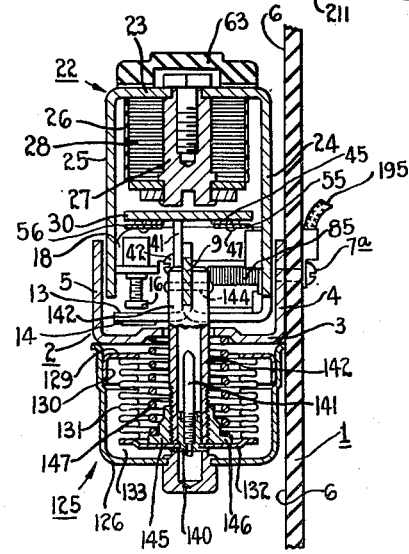
Fig. 3 is a view shown in vertical cross section through certain parts of my device and taken along the line 3—3 of Fig. 2.
Figure 12:
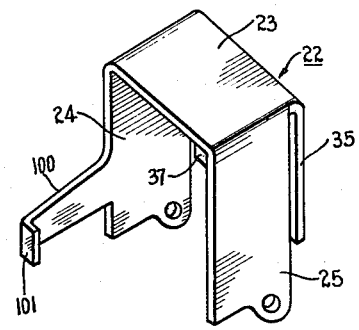
Fig. 12 is a view shown in perspective of a lever employed in my device.
Figure 11:
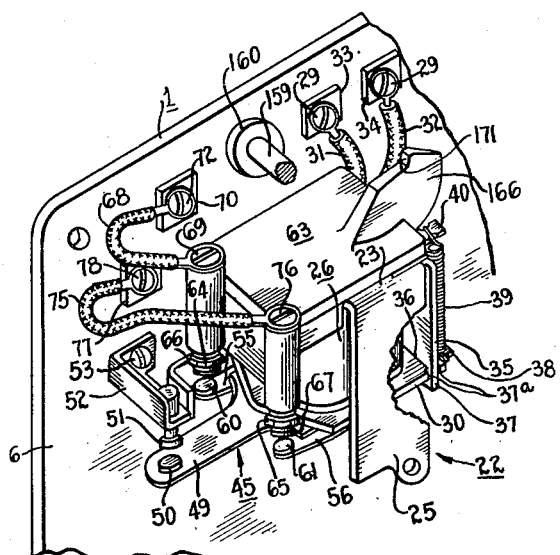
Fig. 11 is a view shown in perspective of other of the operating parts of my device.

Pivotally supported on the shaft 8 there is a lever member or cradle 22 that is preferably of general U-shape having a substantially horizontally disposed base 23 from which depend oppositely disposed, spaced, substantially parallel sides or arms 24 and 25 that have aligned apertures adjacent their lower ends for receiving the shaft 8. The preferred shape of the cradle 22 will be more clearly seen from the perspective view thereof, Fig. 12. The cradle 22 straddles the lever member 9, and the sides or arms 24 and 25 of the cradle position between and preferably adjacent the inner sides of the upturned flanges 4 and 5, respectively, of the channel-shaped supporting member 2. Carried by and depending from the underside of the cradle base 23 there is an electromagnet 26 which may be of the usual type having a core 27 surrounded by a coil of wire 28 that is preferably covered by a suitable covering material, see Fig. 3. Disposed between the lower end of the magnet core 27 and the lever 9 there is an armature 30, preferably in the form of a plate that is attracted by the magnet and moves upwardly toward the lower end of the magnet core when the magnet is energized. The coil of wire 28 of the electromagnet 26 may have its ends 31 and 32 connected by binding posts or screws 29 to terminal posts 33 and 34, respectively, that may be secured in and to the board 1. The terminal posts 33, 34 and binding posts or screws 29 preferably project through the supporting board 1, the screws 29 preferably receiving nuts at the back of the board for attaching jumper wires to the terminal posts 33 and 34, see Fig. 8.

The cradle base 23 has a downturned flange 35 that extends along one edge of the base substantially transverse to the sides 24 and 25. The lower edge of the downturned flange 35 terminates, as at 36, at a point below the lower end of the magnet core, the lower edge 36 of the flange 35 being spaced from the upper edge of the lever arm 11 and disposed adjacent the fulcrum of the lever arm. The lower edge 36 of flange 35 serves as a fulcrum for the armature plate 30 and the armature plate 30 is arranged so that its upper surface, across the width of the plate adjacent one edge thereof, abuts the lower edge 36 of flange 35. The lower edge 36 of flange 35 is preferably recessed providing spaced, downwardly directed extended portions 37 at the side edges of the flange 35, and the opposite side edges of the armature plate 30 are provided with cut-outs or notches 37a for receiving said extended portions 37 to prevent undue side movement of the armature. The armature 30 has an extended portion 38 that extends from the fulcrumed end of the armature substantially parallel with and toward the end of lever arm 11, and attached to the extended portion 38 is one end of a vertically disposed coil spring 39 which has its other, or upper end attached to an arm member 40 which may be secured to the cradle base 23. The coil spring 39 is under tension and acts to maintain the armature in contact with its fulcrum and also acts to pivot and move the armature 30 down and away from the magnet 26 when the magnet is deenergized. Downward movement of the armature 30 is limited by an adjustable stop member 41 carried by the lever member 9. The stop member 41 is preferably an eccentric in the form of a disc and may be adjustably secured flat against the side of lever arm 10 by means of a screw 42. A portion of the eccentric disc, or stop member 41 extends above the upper longitudinal edge of lever arm 10 for abutment with the underside of the armature plate 30 adjacent the free end of the armature, or end opposite its fulcrum.

Carried by and movable with the armature 30 there is a contact carrying member 45 that is disposed immediately above and extends longitudinally of the main lever 9. The member 45 is preferably formed of thin resilient, or flexible sheet metal and preferably lies flat against the underside of the plate-like armature 30. One end 46 of the flexible member 45 is preferably secured to the armature 30, adjacent the fulcrumed end of the armature, by rivets 47. Intermediate its ends the blade member 45 is provided with an aperture or opening 48 therethrough that overlies the stop member 41 and permits the armature 30 to directly contact or abut the stop member 41. The flexible member 45 projects beyond the free end of the armature 30, and at a point slightly beyond the free end of the armature 30 the member 45 is preferably of reduced width, as at 49. At its free end the member 45 has secured thereto an upwardly facing contact member 50 that cooperates with a fixed contact member 51 which is mounted on the board 1 by a bracket 52. The bracket 52 projects from the front face of the board 1 and may be secured to the board by a screw 53 and a nut 54 threaded onto the screw at the back of the board. The screw 53, besides serving to secure the bracket 52 to the board 1, also serves as a binding post for a wire of a circuit to be hereinafter described. Carried by and movable with the armature 30 there is a pair of spaced, substantially parallel contact carrying members or blades 55 and 56 that extend longitudinally of the contact supporting member 45 and lie flat against the underside of the blade member 45. The blades 55 and 56 are preferably integral and formed out of a sheet of resilient, or flexible metal, the blades being joined at one end by a laterally extending portion at which the blades may be secured to the armature 30, at the fulcrumed end of the armature, by the same rivets 47 that secure the blade member 45 to the armature. The spaced blades 55 and 56 extend substantially parallel to each other and project beyond, or past the free end of the armature 30, emerging from beneath the blade member 45 on either side of the reduced blade portion 49. The free ends of the blades 55 and 56 preferably terminate between the free end of the armature plate 30 and the free end of the center blade 45, and at their free ends the blades 55 and 56 carry upwardly facing contact members 60 and 61 respectively.

Mounted on the top of the cradle 22 and movable therewith there is a supporting member 63 of plate-like form that is constructed of electric insulating material. The supporting member 63 overhangs the metallic base 23 of the cradle 22 and the overhanging portion of the supporting member overlies the free ends of the blades 55 and 56. A pair of spaced terminal posts 64 and 65 are carried by the cradle 22 and are rigidly secured in and to the overhanging portion of the supporting member 63. The posts 64 and 65 depend from the supporting member 63 and to the lower ends of the posts are secured contact members 66 and 67 respectively, which overlie and are adapted to cooperate with the contact members 60, 61 of the blades 55, 56 respectively, to control electric circuits to be hereinafter described. One end of a jumper wire 68 is secured to the upper end of the terminal post 64 by a binding post or screw 69, the other end of the jumper wire being attached to a terminal post 70 that is secured in and to the insulating board 1. The terminal post 70 preferably projects through board 1 and has an aperture for receiving a binding post or screw 72 that threads into the post from the front of board 1. The terminal post 70 has a threaded shank portion for receiving a nut 73 located on the back of board 1, see Fig. 8. Attached to the other terminal post 65, at its upper end, there is one end of a jumper wire 75 that may be attached to post 65 by means of a screw 76, or by other suitable means. The other end of the jumper wire 75 is attached to a terminal post 77 that is secured in and to the board 1 and projects through the board. The terminal post 77 may have a threaded aperture therethrough for receiving a screw, or threaded binding post 78, and like terminal post 70 preferably has a threaded shank portion for receiving a nut 79 which is located on the back of board 1.

The lever arm 10 is formed at its end having a laterally extending flange portion 80 that extends toward the face of the supporting board 1 and at its end the flange 80 has an upturned flange portion, or ear 81, that is substantially parallel with the lever arm 10. The lever arm proper and its laterally disposed, upturned ear 81 are provided with aligning apertures for receiving a pin 82. A lever, or trip member 83 is carried by and is pivotally connected to the lever arm 10 of the main lever 9. The trip member 83 is preferably formed at one end having a pair of spaced, laterally positioned ears 84 that position between the lever arm 10 and its ear 81 and are provided with aligned apertures to receive the pivot pin 82. The trip member 83 depends from the lever arm 10 and extends substantially vertically therefrom. Surrounding the fixed pin 82 there is a coil spring 85 having one of its ends 86 bearing against the lateral flange portion 80 of lever arm 10 and its other end 86ª bearing against the upper end of trip member 83, the spring 85 being under tension and acting to pivot the trip member in a counterclockwise direction, as seen in Fig. 6.

The base 3 of the channel-shaped supporting member 2 is formed, at the end that is adjacent the end of lever arm 10, having a downturned flange portion 87 that has a pair of spaced, substantially parallel ears 88 disposed beneath the end of lever arm 10 and extending substantially parallel therewith. The ears 88 are provided with aligned apertures for receiving a pin 89 on which a contact supporting member, or lever 90 is pivotally supported for controlling an electric circuit. The lever 90 may be termed a safety switch for, as will later be seen, the trip member 83 cooperates with the lever 90 to open a main circuit in the event of failure of combustion of a heating apparatus controlled by my device. The contact supporting member 90 is preferably in the form of a plate having upturned side flanges 91 that extend beyond or past one end 92 of the member 90, providing ears 93 having aligned apertures for receiving the pin 89. At its free end the supporting member 90 carries an upwardly facing contact member 95 that cooperates with a fixed contact member 96. The fixed contact member 96 is mounted on the board 1 by a bracket 97 that may be secured to the board by a screw 98. Besides serving to secure the bracket 97 to the board 1, the screw 98 also serves as a binding post for a wire of the circuit controlled by the member 90. Integral with the cradle-depending side flange 24 that is disposed toward the board 1 there is a lever arm 100 that extends longitudinally of the lever member 9 and toward the trip member 83. At its free end the lever arm 100 is formed having an outturned flange portion 101 for seating on an extended portion or arm 102 of the trip member 83. The arm 102 is also adapted to engage the flange 80 of lever arm 10 to limit clockwise movement of the trip member 83, as seen in Fig. 6. Surrounding the shaft 8 there is a coil spring 103 that has one end 103ª bearing against one edge of the cradle side flange 24, and its other end 104 bearing against the upper edge of lever arm 11. The spring 103 is under tension and acts to pivot the cradle 22 in a counterclockwise direction, as seen in Fig. 6, and through engagement of lever arm 100 with trip member 83 acts to pivot the trip member in a clockwise direction. During normal operation of a heating system controlled by my device, the contact members 95 and 96 are held in engagement and the trip member 83 is positioned between the ears 93 of the members 90 and held in abutment with the end edge 92 of member 90 by the cradle lever arm 100. Surrounding the pivot pin 89 there is a coil spring 105 that has one end bearing against the end edge 92 of member 90 and its other end bearing against the downturned flange 87 of the channel-shaped support 2. The coil spring 105 is under tension and acts to pivot member 90 in a clockwise direction and hold its contact member 95 in engagement with the fixed contact member 96. Under certain conditions, which are hereinafter described in detail, the lower end of the trip member 83 will engage the upper face of the contact supporting member 90 and the member 90 will be moved to the position shown in dotted lines in Fig. 6, in which position the contacts are parted opening the circuit. Carried by the bracket 97 there is a manually operable push rod 106 for returning the trip member 83 to its normal position to permit the supporting lever 90 to pivot upwardly and close the circuit through engagement of the contacts 95 and 96. The push rod 106 is arranged so that its inner end will abut the trip member 83 when the rod 106 is pushed inwardly, and preferably a coil spring 106ª surrounding the rod is provided for automatically returning the push rod to its normal, or outer position.

Associated with the lever member 9 there is a second lever member 107 that is positioned flat against one side, and extends longitudinally of the lever arm 11. The lever member 107 extends over the shaft 8 transverse thereto, and has a free end 108 that preferably terminates slightly past or beyond the shaft 8, see Fig. 6. At its free end the lever member 107 is preferably formed having an upwardly directed, extended portion 109 for engagement with the underside of the plate-like armature 30. The under edge of the lever member 107 preferably curves concavely and rides, or bears on a cylindrical shaped bearing member 110 which, in the present instance, is in the form of an annular flange formed integral with the shaft 8. The shape of the lever member 107 preferably conforms in general to the shape of the lever arm 11, and the lever arm 11 and lever 107 each preferably has a downwardly extending portion or leg 111 and 112 respectively. The leg 111 of the lever arm 11 is arranged so that its lower end will engage the upper surface of the base 3 to limit pivotal movement of the lever member 9 in a clockwise direction, as seen in Fig. 6. The leg 112 of the lever member 107 is arranged so that its lower end will engage the upper surface of the base 3 to cause the free end of the lever 107 to be raised to engage and move the armature 30 upward to hold contact member 50 in engagement with its cooperative contact member 51 and prevent disengagement of these contacts in the event that the electromagnet 26 becomes deenergized.

Figure 10:
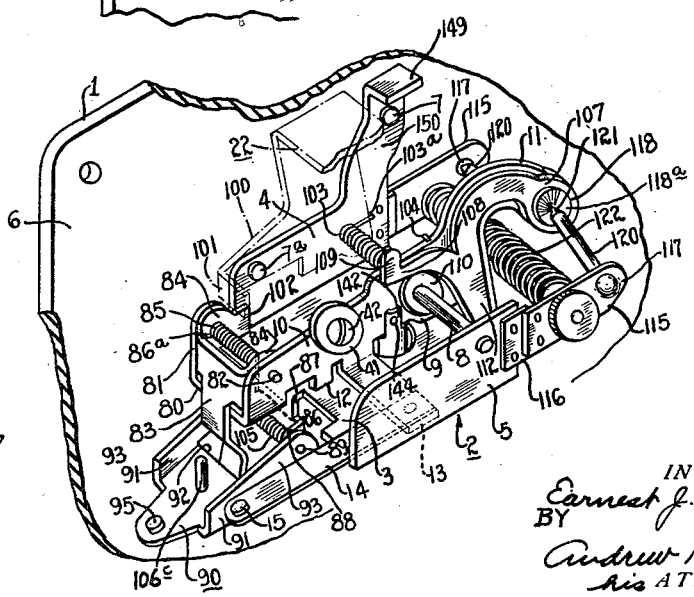
Fig. 10 is a view shown in perspective of certain of the operating parts of my device.

A snap acting mechanism is employed to actuate the levers 9 and 107 in a counterclockwise direction, as seen in Fig. 10, and this mechanism includes a pair of spaced, laterally positioned, substantially parallel arms 115 that are secured one to each of the sides 4 and 5 of the support 2. In the present instance, one of the arms 115 is disposed in a recess in the face of board 1, the recess preferably being of a depth such that the outer face of the arm is substantially flush with the outer face of board 1. The arms 115 are secured to the sides 4 and 5 by hinge members 116 in the form of resilient metal plates, preferably of phosphorous bronze, riveted or otherwise secured to the sides 4 and 5 such that the arms 115 constitute flexible portions of the sides 4 and 5. The flexible arms 115 extend longitudinally of arm 11 of lever 9, one on each side thereof, and at their free ends are provided with inwardly facing, substantially conical recesses or sockets 117. At their outer ends the lever arm 11 and lever member 107 are provided with aligned apertures for receiving a pin 118 to pivotally connect the levers together, the lever member 107 being movable relative to lever member 9. The pin 118 is preferably fixedly secured in and to the lever arm 11 and in its opposite ends is provided with recesses or sockets 118ª. The flexible arms 115 and the levers 107 and 9 are operatively connected by thrust members 120, preferably rods or pins which terminate at their opposite ends in conical points 121 seating in the pairs of sockets 117 and 118ª. The pins 120 are held in position in their sockets by a tension spring 122 secured at its opposite ends to the flexible lever arms 115, urging the flexible arms toward each other. The spring 122 acts through the flexible arms 115 and pins 120 to pivot the levers 9 and 107 in a counterclockwise direction, as seen in Fig. 10, and when this occurs the inner ends of the pins 120 move upward above their outer ends to the position shown. The spring 122 is preferably of the helical coil type terminating at one end in a hook 123 engaged in an aperture in the flexible arm 115 that is disposed in the recess in the face of the board 1. The other end of the spring 122 is secured to an adjustable member, or nut 123ª that receives an adjustment member 124 in the form of a screw carried by the outer arm 115. The adjustment screw 124 is journaled for rotation in the outer flexible arm 115, the screw being held against longitudinal movement. On its outer end the adjustment screw 124 may be provided with a knob for rotating the screw and it will be apparent that through rotation of the adjustment screw 124 the tension of the spring 122, or force opposing pivotal movement of lever 9 in a clockwise direction, as seen in Fig. 6, can be varied as desired.

The lever members 9, 107 and cradle 22 are actuated and pivoted together in a clockwise direction, as seen in Fig. 6, by an electrically energized heat motor when the heat motor is energized and exerts a force of sufficient magnitude to overcome the opposing force exerted by the spring 122 of the snap-acting mechanism. Fig. 14 shows in full line the position of the lever member 9 prior to energization of the power element 125, and also the cooperative relationships of the sockets 117 and 118ª which receive the thrust members 120. The position of the lever member 9 and sockets 117 and 118ª subsequent to movement, by the power element 125, overcenter are shown by the dash-dot lines. The line of centers is shown by the line C—C. The heat motor includes a power element 125 that is preferably carried by and depends from the underside of the base 3 of the channel-shaped support 2. The power element 125 includes a cap-like casing 126 having an open side disposed toward the underside of the base 3, the cap having an outturned annular flange 127 that seats against the underside of the base. The annular flange 127 may be provided with apertures for receiving screws 128 that may thread into the base 3 to rigidly secure the power element thereto. Disposed within the casing 126, adjacent its open or upper end, there is a plate member 129 which extends transverse to the side wall of the casing, see Fig. 3. The plate member 129 has a downturned, continuous flange 130 that abuts the inner wall of casing 126 and may be secured and sealed thereto by solder, or other suitable means, to provide a fluid-tight joint between the outer periphery of the plate member 129 and the inner wall of casing 126. The plate member 129 has a centrally disposed aperture therethrough and secured and hermetically sealed to a border portion of the plate around its aperture is one end of a metallic bellows member 131. The other, or free end of the bellows 131 is secured and hermetically sealed to a movable end wall or plate member 132. The bellows 131 and its casing 126 cooperate to provide an expansible chamber 133 that communicates with a bulb element or container 134 through a tube or conduit 135. A temperature responsive, expansible-contractible fluid is contained in chamber 133, bulb 134, and tube 135 and this fluid may be methyl chloride, or any other suitable fluid. Wrapped around the bulb 134 there is a coil of wire 136 having a high resistance to flow of current so as to generate heat, and preferably the coil 136 is enclosed by a covering of material having a low heat conductivity. When the resistance wire 136 is energized the expansible fluid is heated and will expand and exert a force acting and operable to compress the bellows 131. The ends of the resistance wire 136 may be connected to terminal posts 137 and 138 secured in and to the insulating supporting board 1. The movable end wall 132 of the bellows 131 is provided with a centrally disposed aperture for receiving a reduced end portion of a tubular shaped collar 140, the end of the reduced portion preferably being peened over and solder applied to the joint to secure the collar to the wall 132 in a fluid-tight manner. The tubular collar 140 projects into bellows 131 and is internally threaded for receiving a filler tube, a portion of which is shown at 141. The expansible-contractible fluid is introduced into the expansible chamber 133 through the filler tube, after which the tube is severed and the severed end sealed. Surrounding or telescoping over the tubular collar 140 is one end of a vertically extending, tubular-shaped thrust or connecting member 142 that operatively connects the bellows 131 and lever member 9. The tubular connecting member 142 extends centrally through the bellows 131 and through an aperture in the base 3, and projects above the upper face of the base. The upper end of the thrust member 142 is preferably bifurcated to receive the lever arm 10 and is preferably connected to the lever arm at a point adjacent the fulcrum of the lever 9. The bifurcated end of the thrust member 142 and the lever arm 10 may be provided with aligning apertures for receiving a pivot pin 144 for pivotally connecting the lever member and thrust member together.

A lower end portion of the tubular thrust member 142 is preferably externally threaded for receiving an internally threaded abutment member 145 that preferably seats against the bellows movable end wall 132 and preferably has an external annular flange 146. Surrounding the thrust member 142 there is a coil spring 147 that has one end in abutment with the annular flange 146 of abutment member 145 and its other, or upper end in abutment with the underside of the base 3 of the channel-shaped support 2. The spring 147 is under compression and acts to expand the bellows 131 to the position shown in Fig. 3. When the bellows is compressed by the expansion of the fluid in chamber 133 and sufficient force is generated to overcome the combined forces of springs 147 and 122 of the snap acting mechanism, the thrust member 142 is moved upward and the levers 9 and 107 are pivoted with a snap action, in a clockwise direction, as seen in Fig. 6. Through the connection of the lever arm 10 with the lever arm 100 of the cradle 22, via the trip member 83, the cradle is also pivoted in a clockwise direction by the power element 125. Pivotal movement of the cradle 22 in a clockwise direction is limited by a stop member 149, the stop member 149, in the present instance, being an outturned flange portion at the upper end of an extended portion 150 of the side flange 4.

The supporting board 1 and the parts of my device mounted thereon are preferably enclosed in a casing 151 which, in the present instance, is a rectangular shaped casing constructed in two parts comprising a box-shaped body 152 and a box-shaped cover 153, see Fig. 4. The board 1 is disposed with its rear face toward and in spaced relation to the rear wall, as at 154, of the body 152. Adjacent its edges the board 1 may be provided with a plurality of spaced apertures therethrough for receiving screws 155 that may thread into threaded apertures in the rear wall 154 of the body 152 to rigidly secure the board 1 to the body. Preferably the screws 155 extend longitudinally through tubular spacer members 157 disposed between the board and the body rear wall 154. The supporting board 1 is provided with an aperture therethrough, adjacent its upper end, that registers or aligns with an aperture through the body rear wall 154, and through these aligned apertures extends a rotatable shaft 158 having an inner end portion 159 that projects forwardly of the face of the board 1 within the casing 151 and overlies the upper end of the cradle 22. Preferably the aperture in the board 1, of electric insulating material, is faced by a metallic tubular bearing member 160 secured in and to the board 1. The other, or outer end of the shaft 158 projects externally of the casing 151 and extends longitudinally through a tube 161 that is rigidly secured at one end to the rear wall 154 of the body 152 externally thereof. The outer end of the shaft 158 projects beyond or past the outer end of the tube 161, and secured to and adjacent the outer end of the shaft is one end of a temperature responsive element 162 for rotating the shaft 158. The temperature responsive element shown is of a conventional type consisting of a strip of bimetal in the form of a helical coil that surrounds the shaft 158 having its other, or inner end secured to and adjacent the outer end of the rigid tube 161. The temperature responsive element 162 is to be disposed in heat transfer relation with a heating apparatus, the operation of which is to be controlled; and as one manner of installation the element 162 may be disposed within the smoke stack in the path of the hot gaseous products of combustion.

Figure 2:
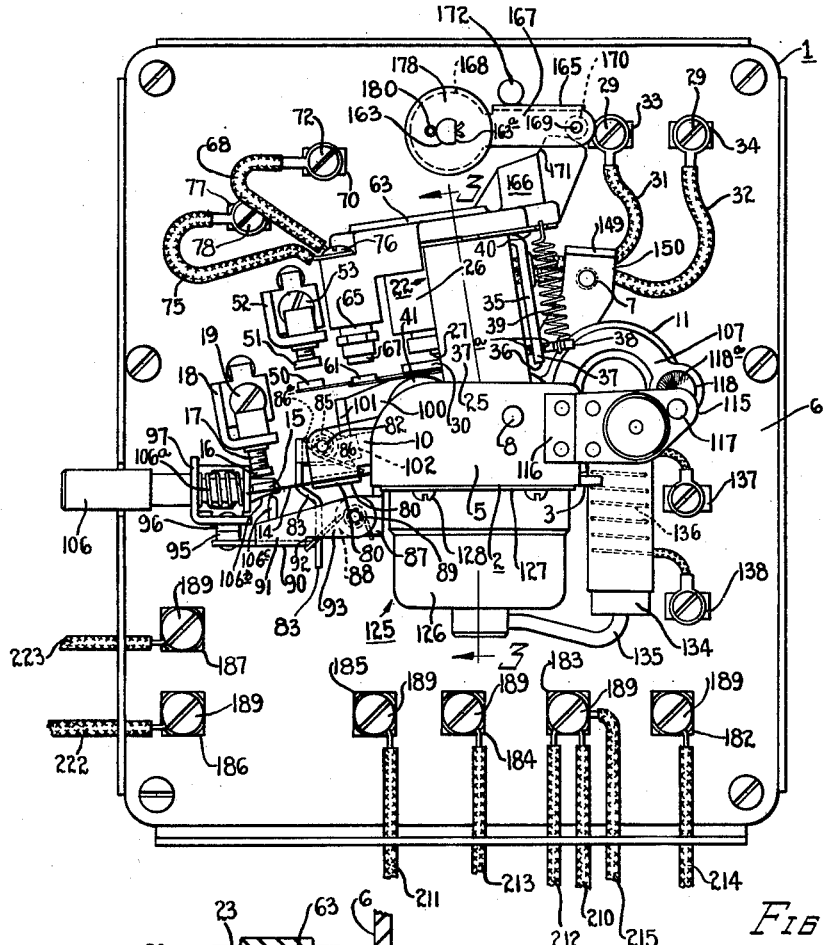
Fig. 2 is a front view shown in elevation of my control device with the cover removed to show the parts of the device and their arrangement.

The shaft end portion 159 that projects forwardly of the front face of the board 1 preferably has an end portion 163 of reduced diameter providing an outwardly facing annular shoulder 164 located adjacent the front face of board 1, and preferably the reduced portion 163 has a flattened portion 163a longitudinally thereof for a purpose to be hereinafter described. Supported on the reduced end portion 163 of the shaft 158 there is a holding, or catch member 165 that is adapted to cooperate in holding relation with a latch member 166 carried by the cradle 22 to prevent pivotal movement of the cradle in a counterclockwise direction, as seen in Fig. 2, at all temperatures of a heating apparatus above a predetermined temperature. The catch member 165 may be of plate-like form having downturned, substantially parallel side flanges 167 having portions 168 in the form of ears that project beyond one end of the catch member proper and may be provided with aligned apertures to receive the reduced end portion 163 of shaft 158. The catch member 165 extends substantially horizontally, and adjacent its free end its downturned side flanges 167 are preferably provided with aligned apertures for receiving a pin 169 on which a roller member 170 is supported between the side flanges 167 for engaging the latch member 166 of the cradle 22. The latch member 166, in the present instance, is formed as an integral part of the supporting member 63 that is carried on the upper end of the cradle 22. The latch member 166 projects upwardly from the supporting member 63 and its upper end is formed having a shoulder 171 that faces toward the pivoted end of the catch member 165 and against which shoulder the roller 170 is adapted to abut to prevent pivotal movement of the cradle 22 in a counterclockwise direction, as seen in Fig. 6. Secured in and to the board 1 there is a pin 172 that projects forwardly and above the catch member 165 and serves as a stop for limiting movement of the latch member 166 in a counterclockwise direction, as seen in Fig. 6.

Carried by the shaft 158 on its reduced end portion 163 there is a frictional slip clutch for operatively connecting the shaft and catch member 165, the slip clutch preferably providing only sufficient frictional engagement between the shaft 158 and catch member 165 to permit transmission of rotatable movement of the shaft to the catch member to position the catch member in front of the shoulder 171. The slip clutch includes a pair of frictional discs 174 and 175 that are apertured to receive the shaft 158, and one of the discs is disposed flat against the outer side of each of the side flanges 167 of the catch member 165. The friction discs 174, 175 may be formed of rubber, or any other material having a suitable coefficient of friction. The discs 174, 175 preferably seat in metallic, cap-like abutment members 176 and 177 respectively that are apertured to receive the shaft 158, and the abutment member 176 abuts or seats against the shoulder 164 of the shaft. Abutting the outer face of the abutment member 177 is one of a pair of spaced abutment members 178 that may be similar to the abutment members 176, 177, and surrounding the reduced inner end portion of shaft 158 there is a helical coil spring 179 having its opposite ends in abutment with the abutment member 177. The spring 179 is under compression and urges the friction discs 174, 175 against the sides of the catch member 165 with a force of just sufficient magnitude such that the catch member will be rotated by the shaft 158 when not in engagement with the latch member 166 or its stop 172, but movement of the catch member 165 will not rotate the shaft 158. The apertures in the abutment members 176, 177 and 178 preferably conform in contour to the contour of the flattened portion of shaft 158 or, in other words, wall portions defining the apertures are flattened to cooperate with the flattened portion 163a of the shaft 158 so that the abutment members will rotate with the shaft. A cotter pin 180, or other suitable means may be provided for retaining the spring 179 under compression on the shaft 158. The lost motion connection between the shaft 158 and the catch member 165 prevents injury to the temperature responsive element 162 in the event of undue rotation of the shaft, and also provides for a quick unlatching of the latch and catch members upon a slight pivotal movement of the catch member in a counterclockwise direction, as seen in Fig. 6.

Secured in and to the board 1, adjacent its lower edge, there is a plurality of spaced terminal posts 182, 183, 184, 185, 186 and 187, see Figs. 1 and 8. These posts, which may be termed the main terminal posts of the device, extend through board 1 and have threaded end portions that project from the back of the board, and for the purpose of simplicity the threaded end portions are designated by the same numerals given to the posts, see Fig. 8. Screw threaded on the above mentioned posts, at the back of board 1, are nuts 188 for securing wires and jumper strips, hereinafter described, to the posts. The posts have threaded apertures opening through their forward ends for receiving binding posts or screws 189 for securing other wires, to be hereinafter described, to the terminal posts. Mounted on the back of board 1 there is a transformer 190 comprising the usual rectangular shaped core 191, primary coil 192, and secondary coil 193. One end of the primary coil 192 is connected to the terminal post 183 by a wire 194, and the other end of the primary coil is connected by a wire 195 to the binding screw 7a that secures the support 2 to the board 1. One end of the transformer secondary coil 193 is connected by a jumper wire 196 to the terminal post 33 and the other end of the secondary coil is connected by a jumper wire 196a to the terminal post 186. The heat motor terminal post 137 is connected by a jumper strip 197 to the terminal post 70 for the contact member 66, and the other heat motor terminal post 138 is connected by a jumper strip 198 to the terminal post 183. A jumper strip 199 connects the terminal post 182 and the binding post 98 of the contact member 96. Connecting the magnet terminal post 34 and the terminal post 187 there is a jumper strip 200. A jumper strip 201 connects the terminal post 185 and the terminal post 19 of contact member 16, and a jumper strip 202 connects the contact terminal 19 to the terminal post 77 of contact member 67 that is carried by the cradle 22. Also a jumper strip 203 connects the terminal post 184 and the terminal post 53 of the fixed contact member 51.

Referring now to Fig. 1, the numeral 204 designates in general a heating apparatus, or furnace, having the usual fire box 205. A fuel supply means, or blower 206, preferably driven by an electric motor is shown for supplying oil to the fire box 205. The furnace 204 has the usual smoke stack 207 in which the temperature responsive element 162 may be located, as shown. Disposed within the fire box 205 adjacent the inner or discharge end of the blower 206 there is a fuel igniter which may be a resistance, or so-called hot wire 209. One end of the ignition wire 209 is connected to the terminal post 183 by a lead wire 210 and the other end of the ignition wire is connected to the terminal post 185 by a lead wire 211. The motor of the blower 206 has one of its terminals connected to the terminal post 183 by a lead wire 212, and has its other terminal connected to the terminal post 184 by a lead wire 213. The main lead wires, designated by the numerals 214 and 215, connect to the terminal posts 183 and 182, respectively, and in the main wire 215 there may be provided a manually operable switch 216. A thermostat 217, responsive to the temperature of a room, or other enclosed space to be heated, is employed for controlling the operation of the control device. The thermostat 217 may be of the conventional type having a supporting base 218 on which is mounted a bimetal blade 219 carrying a contact member 220 for cooperation with a contact member 221 mounted on the base 218. The thermostatic blade 219 is connected by a lead wire 222 to the terminal post 186, and the fixed thermostat contact 221 is connected to the terminal post 187 by a lead wire 223. It is to be understood that the switch arms, or contact blades 90, 14, 45, 55 and 56 are all electrically connected to the terminal post 7a through the metallic, channel-shaped supporting member 2, but to simplify the diagrammatic view of Fig. 1, the blades 56, 55 and 45 are shown connected to post 7a by a line 224 and blades 14 and 90 by a line 225.

When the manual switch 216 in the main line 215 is closed the following circuit will be completed to the transformer primary 192: From the main lead wire 215 to the terminal post 183, jumper wire 194, transformer primary 192, jumper wire 195, binding post 7a through lines 224, 225, safety switch 90, contact members 95, 96, terminal post 98, jumper strip 199 and terminal post 182 back to the other main lead wire 214. When the thermostat 217 becomes dissatisfied and moves its contact 220 into engagement with the cooperative contact 221, a circuit will be completed to the electromagnet 26 which will then be energized and attract its armature 30. This circuit is from the blade 219 through lead wire 222, terminal post 186, jumper strip 196a, transformer secondary 193, jumper wire 196, terminal post 33, jumper wire 31, magnet 26, jumper wire 32, terminal post 34, jumper strip 200, terminal post 187, lead wire 223 to the fixed contact 221 and from the fixed contact 221 through contact 220 back to the blade 219. When the electromagnet 26 is energized and attracts the armature 30, contact members 60, 61 which are carried by the armature are moved into engagement with their respective contact members 66, 67 that are carried by the cradle 22. The contact member 50 which is also carried by the armature 30 will move toward its cooperative contact member 51 when the electromagnet 26 is energized, but the spacing between these contacts is made such that the magnet will not cause them to become engaged. When the contact members 61, 67 engage, a circuit is completed to the ignition means 209 which is then energized. The contact members 61, 67 may be termed the pre-ignition contacts and when they are in engagement the circuit completed to the ignition means 209 is as follows: From the main line 215 to the terminal post 183 through lead wire 210, ignition means 209, lead wire 211, terminal post 185, jumper strip 201, jumper strip 202, terminal post 78, jumper wire 75, contacts 67, 61, blade 55, lines 224, 225, safety switch 90, contact members 95, 96, terminal post 98, jumper strip 199, terminal post 182 and back to the other main line 214. Simultaneously with the energization of the ignition means 209 the resistance coil 136 of the heat motor is energized through engagement of contacts 60, 66, this circuit being from the main lead wire 215 to the terminal post 183 through the jumper strip 198, terminal post 138, resistance coil 136 of the heat motor, terminal post 137, jumper strip 197, terminal post 70, jumper wire 68, contact members 66, 60, blade 56, lines 224, 225, safety switch 90, contact members 95, 96, terminal post 98, jumper strip 199 to the terminal post 182 and from the terminal post 182 back to the other main line 214. Upon energization of the heat motor resistance coil 136 the expansible-contractible fluid in the bulb 134 begins to expand and acts to move the bellows 131. When the force exerted by the expanded fluid acting against the bellows 131 exceeds the opposing force exerted by the tension spring 122 of the snap acting mechanism, and the force exerted by the spring 147, the lever members 9 and 107 will be pivoted with a snap-action, in a clockwise direction, as seen in Fig. 6. Also, by reason of the connection between the lever arm 10 and the arm 100 of the cradle 22, via the trip member 83, the cradle will also be pivoted with a snap-action in a clockwise direction, as seen in Fig. 6. Pivotal movement of the lever member 9 and the cradle 22 in a clockwise direction causes the contact members 50 and 15 to engage their respective contact members 51 and 16. Due to the upward movement of the cradle 22 the contact members 66 and 67 are moved out of engagement with their respective contact members 60 and 61, and as a result the circuits controlled by the pre-ignition contacts 61 and 67, and the heat motor contacts 60, 66 are opened. However, engagement of the contact members 15 and 16 closes a circuit to the ignition means 209 and these contacts may be known as the post-ignition contacts. The circuit completed to the ignition means 209 through engagement of the post-ignition contacts 15 and 16 is as follows: From the contact member 16 to the binding post 19 through jumper strip 201, terminal post 185, lead wire 211, ignition means 209, lead wire 210, terminal post 183 to the main lead wire 215 and from the other main wire 214 to the terminal post 182 through the jumper strip 199, terminal post 98, contacts 96, 95 of the safety switch 90, line 225, lever member 9, blade 14 through its contact 15 and back to the fixed contact 16. Engagement between the contact members 50, 51 causes the motor of blower 206 to be energized to drive the blower and supply fuel for ignition by the ignition means 209 in the fire box 205. The circuit of the blower 206 is from the contact member 51 to the terminal post 53 through the jumper strip 203, terminal post 184, lead wire 213 to a terminal of the blower motor, thence from the other motor terminal through lead wire 212, terminal post 183, main lead wires 215, 214, terminal post 182, jumper strip 199, terminal post 98 through the cooperative contacts 96, 95 of the safety switch 90, lines 225, 224 and through blade 45 to the contact member 50 and back to contact member 51. If the fuel is ignited, the furnace 204 of course heats up and the temperature responsive element 162 in the stack 207 operates to rotate the shaft 158 and pivot the catch member 165 into holding relation with the latch member 166 of the cradle 22 to hold the cradle in its raised position to which it was moved by the heat motor. Since the time of parting of the heat motor contacts 60, 66 the heat motor has, of course, been deenergized and the force exerted by the power element 125 has consequently been decreasing. When the force of the power element 125 decreases to a force less than the combined force exerted by the holding spring 122 of the snap-acting mechanism and the force exerted by the spring 147, the lever members 9 and 107 are pivoted with a snap-action in a counterclockwise direction, as seen in Fig. 6.

When the snap-acting mechanism pivots lever members 9 and 107 in a counterclockwise direction the main or normal ignition contacts 15, 16 will be parted opening the circuit of the igniter 209, but the blower motor contacts 50, 51 will remain in engagement so long as the room thermostat keeps the electromagnet 26 energized and the temperature responsive element 162 holds the cradle 22 in its raised position. The lever member 107 serves to hold the armature 30 in raised position, with the armature carried contact 50 in engagement with its cooperative contact 51 so that while the heat motor has closed the contacts 50, 51 to the blower motor, the breaking of circuit at the room thermostat, although deenergizing the electromagnet 26, will not cause breaking of the blower motor circuit and the circuit will remain closed until the heat motor cools, even though the room thermostat is kept in open circuit position. When the lever 9 is pivoted counterclockwise by the snap-acting mechanism and the cradle 22 is held in its raised position, the trip member 83 carried by lever arm 10 is held in its retracted position by the spring 85 so that it projects through the opening in the safety switch 90 and does not actuate the switch. When the room thermostat 217 becomes satisfied, the electromagnet 26 is deenergized permitting the armature carried, blower motor contact 50 to move to open the circuit to the blower motor thereby stopping the blower. The stack 207 will cool substantially immediately sufficiently to cause release of the cradle 22, which will then move counterclockwise to its initial position so that when the room thermostat again calls for heat the above cycle of operation will be repeated. When the room thermostat calls for heat and the lever member 9 and cradle 22 are moved to their respective positions, as above described, then if the catch member 165 fails to move into holding relation with the cradle latch member 166 both the cradle and the lever 9 will be moved counterclockwise when the heat motor cools, thus breaking the ignition circuit and the circuit of the blower motor. If the catch member 165 does not hold the cradle 22 in its raised position, the arm 101 of the cradle will rest on the arm 102 of the trip member 83. The trip lever spring 85 will then be overcome and the trip member will be moved in a clockwise direction until its arm 102 engages its stop 80. In this position the lower end of the trip lever is positioned to engage the safety switch 90 to move the switch 90 to open circuit position. As long as the cradle 22 and the lever 9 move together in a counterclockwise direction, the safety trip member 83 will be in position to engage the safety switch lever 90 and not pass through the opening in the same, so that on failure of the stack control to hold the cradle 22 in its raised position when the lever 9 returns to its initial position on cooling of the heat motor, the safety switch 90 will be moved to open position. This opening of the safety switch 90 will occur on any cooling operation of the heat motor when the stack control has not functioned to hold the cradle 22 in its raised position, whether it be on initial failure of combustion or on combustion failure on a recycling operation. All of the contacts in the control device are in the high voltage circuit so that no relays are required and the safety switch is in the line ahead of the motor, ignition and heat motor switches so that when the safety switch is open all of the circuits are open.

The push rod 106 and the safety switch 90 are also preferably arranged so that when the push rod is pushed inward against the force of spring 106ª to return the trip member 83 to its inactive or normal position, the switch 90 is pivoted, parting contacts 95 and 96 which remain parted so long as the push rod is held inward. To this end, the push rod 106 may be provided with a downwardly facing, tapered or cam surface 106ᵇ for engaging the upper rounded end of an upstanding pin 106ᶜ carried by the safety switch 90. By providing for the safety switch 90 to be opened when the push rod 106 is pushed inwardly, it will be understood that the main circuit to the fuel supply motor will be opened even though some one may hold the push rod in its inward position, preventing the trip member 83 from engaging and moving the safety switch 90 to open circuit position. The cam surface 106ᵇ and the cooperating pin 106ᶜ are arranged such that when the push rod is released, that is, permitted to return to its normal or outward position, the trip 83 will be released to engage and hold the switch 90 in open circuit position before the switch 90 is released by the push rod, providing of course, that combustion has failed.

In order to prevent injury to the blower motor resulting from undue voltage drop, I provide for the release of the switch carrying armature 30 to open the motor circuit upon the occurrence of a voltage drop to a predetermined voltage higher than the voltage at which an electromagnet would ordinarily release its armature. As is well known, the magnetic force required to raise an armature is greater than the force required to hold the armature in raised position, with the result that a magnet will not release its armature unless the voltage drop is such that the magnetic force becomes less than the force required to hold the armature in its raised position. I have found that the above problem may be overcome by providing means for opposing the force of the magnet in such a manner as to increase the force necessary to hold the armature in raised position without increasing the force necessary to raise the armature. To this end, I prefer to arrange certain parts of my device so that when the motor contacts 50 and 51 are engaged, the blade 45 carrying contact 50 will be under tension, exerting a force tending to separate the armature from the magnet. In my device, when the cradle 22 is moved to its raised position by the power element, the contact 50 engages its cooperative contact 51 before the cradle completes its movement, with the result that when the cradle is in its raised position, the blade 45 is flexed or bowed and under tension as illustrated in Fig. 13. As long as the magnetic force is of sufficient magnitude to hold the magnet in its raised position against the opposing tension force of the blade 45, the contacts 50 and 51 will remain engaged and the circuit to the blower motor will of course remain closed. However, if there should be a drop in voltage to a predetermined voltage, determined by the tensioning of blade 45, then the armature 30 will be released and descending will cause contacts 50 and 51 to part and thus open the motor circuit. The contact member 51 that is mounted on the board 1 is adjustably movable toward and away from contact member 50 so that by adjusting contact member 51 the tension force under which the blade 45 is placed may be varied, and this tension force may be equal to or greater than the force required to raise the armature. Also, when contact 50 is in engagement with contact 51, the blade 45 carrying contact 50 causes end portions of the blades 55 and 56 to be flexed downward, as shown in Fig. 13, parting contacts 60, 66 and 61, 67 when the cradle is moved to its raised or upper position.

From the foregoing description it will now be seen that I have provided a new and improved control device which is highly efficient in controlling the operation of a heating apparatus. In my device the circuit to the fuel supply motor is kept closed by the stack control on cooling of the heat motor if combustion takes place. As a result, if combustion does not occur the circuit to the fuel supply means will be opened when the heat motor cools sufficiently to permit the snap-acting mechanism to move the levers and cradle to their lower, or initial position. As a result of this arrangement, it will be seen that since the time period of cooling of the heat motor is substantially constant, the time period allowed between starting and stopping of the fuel supply motor when combustion fails will be substantially constant. It will also be seen that by providing a holding means, connected to the temperature responsive means through a slip clutch, that the cradle will be released upon a slight decrease in temperature. Upon very slight movement of the holding means, or catch, the cradle will move the catch relative to the temperature responsive element by reason of the slip clutch connection and will return to its lower, or initial position. It will also be seen that I have provided a new and improved snap-acting mechanism and one which may be adjusted to change the force with which it opposes operation of the heat motor. The time lapse between the time of closing of the burner motor contacts 50, 51 by the heat motor, and the time when the combined forces of spring 122 and the spring 147 overcome the heat motor and act to part contacts 50, 51, is the time period allowed for the heating up of the furnace before the safety switch 90 is actuated to open the circuit of the blower motor 206. By adjusting the tension of spring 122 it will be seen that the above-mentioned time period may be changed or regulated as desired, and this is a particularly advantageous feature because different installations require different time periods for the heating up of the furnaces. In addition, I have provided means actuated by the heat motor for holding the magnet actuated motor switch in closed circuit position so that if the magnet is deenergized, for example, due to manual opening of the circuit at the thermostat, the fuel supply motor will not be stopped. By this arrangement repeated stopping and starting of the fuel supply motor through manual manipulation of the room thermostat is prevented, and danger of an explosion in the fire box eliminated. It will thus be seen that after the room thermostat calls for heat and the heat motor closes the fuel supply motor circuit, the fuel supply motor circuit will not be opened until the stack control releases the cradle or, if combustion fails, until the heat motor cools.

What I claim and desire to secure by Letters Patent of the United States is:

1. In a heating apparatus means operable for supplying fuel to the heating apparatus, a thermostat responsive to a region to be heated, a control device for controlling the operation of the heating apparatus comprising a supporting means, a movable member supported by said supporting means, a second movable member having operative connection to and movable with said first-named movable member in one direction, said second-named movable member also being movable relative to said first-named movable member, a heat motor operable when energized to move both of said movable members in said one direction, switch means carried by said second-named movable member for controlling the operation of said heat motor, means actuated by the thermostat and operable to move said switch means to energize said heat motor, switch means carried by said second-named movable member for controlling the operation of said fuel supply means and movable to closed circuit position by said heat motor when said heat motor moves both of said movable members a predetermined distance in said one direction, said first-named switch means being closed to energize said heat motor when the thermostat becomes dissatisfied and being moved to open circuit position by said heat motor through movement of both of said movable members in said one direction, and catch means responsive to combustion conditions of the heating apparatus and operable to hold said second-named movable member against retraction, thereby to hold said second-named switch means in circuit making position on cooling of said heat motor.

2. In a heating apparatus electrically operated means for controlling combustion of the heating apparatus, a thermostat responsive to a region to be heated, a control device for controlling the operation of the heating apparatus comprising a movable member, a second movable member, said movable members being operatively connected for movement together in one direction and also being movable relative to each other, a heat motor operable to move both of said members in said one direction, switch means carried by said second-named movable member for controlling the operation of said heat motor, means actuated by said thermostat and operable to move said switch means to energize said heat motor, said switch means being moved to close the circuit to said heat motor when the thermostat becomes dissatisfied, switch means carried by said second-named movable member for controlling the operation of the combustion controlling means and controlled by the thermostat, said second-named switch means being moved to circuit making position and said first-named switch means to open circuit position by said heat motor when said heat motor moves said movable members in said one direction a predetermined distance, and releasable holding means operable in response to combustion conditions of the heating apparatus to engage said second-named movable member thereby to mechanically hold said second-named switch means in circuit making position on cooling of said heat motor.

3. In a heating apparatus, electrically operated means for controlling combustion of the heating apparatus, a thermostat responsive to a region to be heated, a control device for controlling the operation of the heating apparatus comprising a movable member, a second movable member, said movable members being operatively connected for movement together in one direction and also being movable relative to each other, a heat motor operable to move both of said members in said one direction, switch means carried by said second-named movable member for controlling the operation of said heat motor, means actuated by the thermostat and operable to move said switch means to energize said heat motor, said switch means being moved to close the circuit to said heat motor when the thermostat becomes dissatisfied, switch means carried by said second-named movable member for controlling the operation of the combustion controlling means and controlled by the thermostat, said second-named switch means being moved to circuit making position and said first-named switch means to open circuit position by said heat motor when said heat motor moves said movable members in said one direction a predetermined distance, releasable holding means operable in response to combustion conditions of the heating apparatus to engage said second-named movable member thereby to hold said second-named switch means in circuit making position on cooling of said heat motor, a second switch means controlling the circuit of said electrically operated means, and trip means carried by one of said movable members and operable for moving said last-named switch means to open circuit position upon failure of combustion prior to predetermined cooling of said heat motor.

4. In a heating apparatus, a burner, means to supply fuel to said burner, means to control the operation of said supply means, means responsive to the temperature of a medium to be heated by said burner, snap acting means operable upon movement to actuate said control means with a quick action, means actuated by said responsive means upon occurrence of a predetermined medium temperature to move said snap acting means, means operable upon operation of said supply control means to return said supply control means and said snap acting means to initial position, said snap acting being operable to establish a time delay between the operation of said fuel supply control means to supply fuel and the return of said snap acting means, and means operable upon establishment of combustion by the burner during the time delay to hold said burner supply control means in fuel supplying position.

5. In a heating apparatus, a burner, means to supply fuel to said burner, means to ignite the fuel supplied to said burner, means to control the operation of said supply means, means responsive to the temperature of a medium to be heated by said burner, means for actuating said igniting means and said control means, means actuated by said responsive means upon occurrence of a predetermined medium temperature to initiate operation of said actuating means, means operable substantially concurrently with operation of said supply control means to render said actuating means ineffective thereby to return said supply control means and said actuating means to initial position and to discontinue operation of said igniting means, means establishing a time delay between the operation of said fuel supply control means to supply fuel and the return of said actuating means, and means operable upon establishment of combustion by the burner during the time delay to hold said burner supply control means in fuel supplying position.

6. In a heating apparatus, a fuel burner, means to supply fuel to said burner, temperature responsive switch means, electromagnetically operable switch means controlled by said switch means, electrically energized means controlled by said last-named switch means, a switch controlling said fuel supply means, means operable by said energized means to close said switch and to open the circuit of said energized means, means moved by said energized means and acting for a predetermined time after closure of said switch to hold said switch closed and to render said temperature responsive switch means ineffective to control said electromagnetically operable means, and means operable in response to combustion by said burner within said predetermined time to hold said switch closed during combustion.

7. In a heating apparatus, a fuel burner, means to supply fuel to said burner, temperature responsive switch means, electromagnetically operable switch means controlled by said switch means, electrically energized means controlled by said last-named switch means, a switch controlling said fuel supply means, means operable by said energized means to close said switch and to open the circuit of said energized means thereby to start operation of said burner, means acting for a predetermined time after closure of said switch to hold said switch closed thereby to render said temperature responsive switch means ineffective to control said burner, means operable in response to combustion by said burner within said predetermined time to hold said switch closed during combustion, a safety switch, and means operable to open said safety switch upon failure of combustion during said predetermined time.

8. In a heating apparatus, a fuel burner, means to supply fuel to said burner, temperature responsive switch means, electromagnetically operable switch means controlled by said switch means, electrically energized means controlled by said last-named switch means, a switch controlling said fuel supply means, means operable by said energized means to close said switch and to open the circuit of said energized means thereby to start operation of said burner, means acting for a predetermined time after closure of said switch to hold said switch closed thereby to render said temperature responsive switch means ineffective to control said burner, means operable in response to combustion by said burner within said predetermined time to hold said switch closed during combustion, a safety switch, and means operable to open said safety switch and said fuel supply controlling switch upon failure of combustion during said predetermined time.

9. In a heating apparatus, a burner, electrically operable means to supply fuel to said burner, a supporting means, a supporting structure having an inactive position and movable by said supporting means to an active position, said supporting means being separate from and engageable with said structure and operable on movement in one direction to move said structure to its active position and having a retractive movement, switch means controlling the circuit of said fuel supply means and moved to circuit closing position by movement of said structure to active position, means to retract said supporting means, means establishing a time delay between closure of said switch means and operation of said retracting means, a safety switch controlling the circuit of said electrically operable means, a safety switch tripping means movable by said supporting means to open said safety switch, combustion responsive holding means movable into the path of movement of said supporting structure and operable upon establishment of combustion during said time delay to retain said supporting structure in its active position and to permit said supporting means to move to the retracted position, and means operable upon retention of said supporting structure in its active position to render said tripping means ineffective.

10. In a heating apparatus, a burner, electrically operable means to supply fuel to said burner, a supporting means, a supporting structure having an inactive position and movable by said supporting means to an active position, said supporting means being separate from and engageable with said structure and operable on movement in one direction to move said structure to its active position and having a retractive movement, switch means controlling the circuit of said fuel supply means and moved to circuit closing position by movement of said structure to active position, means to retract said supporting means, means establishing a time delay between closure of said switch means and operation of said retractive means, a safety switch controlling the circuit of said electrically operable means, a safety switch tripping means movable by said supporting means to open said safety switch, combustion responsive holding means movable into the path of movement of said supporting structure and operable upon establishment of combustion during said time delay to retain said supporting structure in its active position and to permit said supporting means to move to the retracted position, means engageable with and operable to hold said switch means in circuit closing position during said time delay, and means operable upon retention of said supporting structure in its active position to render said tripping means ineffective.

11. In a heating apparatus, a burner, electrically operable means to supply fuel to said burner, a supporting structure having an inactive position and movable to an active position, supporting means operable on movement in one direction to move said structure to its active position and having a retractive movement, switch means controlling the circuit of said fuel supply means and moved to circuit closing position by movement of said structure to active position, means to retract said supporting means, means establishing a time delay between closure of said switch means and operation of said retracting means, a safety switch controlling the circuit of said electrically operable means, a safety switch tripping means movable by said supporting means to open said safety switch, combustion responsive holding means movable into the path of movement of said supporting structure and operable upon establishment of combustion during said time delay to retain said supporting structure in its active position, mean operable to reset said safety switch upon opening thereof by said tripping means and acting to hold said safety switch in open position while moving said tripping means to inactive position, and means operable upon retention of said supporting structure in its active position to render said tripping means ineffective.

12. In a heating apparatus, a fuel burner, electrically operable means to supply fuel to said burner, means to ignite the fuel supplied to said burner, temperature responsive switch means, electromagnetic means energized by operation of said switch means, a movable supporting structure carrying said electromagnetic means, electrically energized power means, switch means carried by said supporting structure and closed upon energization of said electromagnetic means to energize said fuel igniting means and said power means, fuel supply controlling switch means having a movable contact member carried by and movable with and relative to said structure and having a stationary contact member fixed relative to said movable contact member and to said structure, said first-named switch means being so constructed and arranged relative to said fuel supply switch means that engagement of said movable contact member with said fixed contact member will move said first-named switch means to open position, a movable supporting means movable by said power means and engageable with and to move said structure to move said movable contact member into engagement with said fixed contact member, a closed safety switch controlling the circuit of said electrically operable means, safety switch tripping means movable to an active position upon movement of said supporting means to engage and move said structure, switch means movable by said supporting means and controlling said fuel igniting means, means operable upon movement of said structure by said supporting means to hold said fuel supply controlling switch means in closed position, means responsive to combustion temperature and operable upon establishment of combustion to move into holding engagement with said structure thereby to keep said fuel supply controlling switch means releasably in closed position, and means operable upon retraction of said supporting means to move said tripping means out of active position.

13. In a heating apparatus, a fuel burner, means to supply fuel to said burner, an electrically energized heat motor, a switch controlling energization of said heat motor, magnetic means operable upon energization to close said heat motor switch, a temperature responsive switch controlling the circuit of said magnetic means, a movable supporting structure carrying said magnetic means and said heat motor switch, a switch controlling said fuel supply means and mechanically connected to said heat motor switch such that movement of said fuel supply controlling switch to closed position will move said heat motor switch to open position, a supporting means movable by and with said heat motor upon heating and cooling thereof and operable upon heating of said heat motor to engage and move said supporting structure thereby to move said fuel supply controlling switch to closed position, means establishing a predetermined time period after opening of said heat motor switch before occurrence of retractive heat motor movement upon cooling of said heat motor, a closed safety switch controlling the circuit of said fuel supply means, safety switch tripping means movable into safety switch opening position upon movement of said supporting structure by said supporting means so that upon simultaneous retractive movement of said structure and said supporting means said tripping means will act to open said safety switch, combustion responsive holding means operable upon establishment of combustion to oppose retractive movement of said supporting structure so that said magnetic means will hold said fuel supply switch means closed, means operable upon retention of said supporting means in switch means closing position to move said tripping means out of safety switch opening position, and means to hold said fuel supply controlling switch in closed position during said time period irrespective of opening of said temperature responsve switch.

14. In a heating apparatus, a fuel burner, electrically operated means to supply fuel to said burner, a switch controlling the circuit of said means, a closed safety switch controlling the circuit of said means, means to ignite the fuel supplied to said burner, actuating means operable on movement in one direction to close said first-named switch and to energize said igniting means, means operable upon establishment of combustion to hold said first-named switch mechanically in closed position, and means moved by said first-named switch upon movement thereof to open position and operable upon failure of combustion to be established within a predetermined time following closure of said first-named switch to open said safety switch.

15. In a heating apparatus, a fuel burner, electrically operated means to supply fuel to said burner, a switch controlling the circuit of said means, a closed safety switch controlling the circuit of said means, means to ignite the fuel supplied to said burner, actuating means operable on movement in one direction to close said first-named switch and to energize said igniting means, means operable upon establishment of combustion to hold said first-named switch mechanically in closed position, said actuating means acting upon movement in the opposite direction to deenergize said igniting means, and means moved by said first-named switch upon movement thereof to open position and operable by said actuating means upon failure of combustion to be established within a predetermined time following closure of said first-named switch to open said safety switch.

16. In a control apparatus for a heating system, an electrically operated heat supplying means, temperature responsive means sensitive to the output of said operated means, a switch means having three positions of operation and moved by said sensitive means from one of said positions to a second of said positions, power means for moving said switch means from said second position to a third of said positions and energized upon movement of said switch means to said second position, said switch means being operable upon movement to said third position to deenergize said power means and to energize said operated means, means for moving said switch means to said first position subsequent to movement thereof to said third position to deenergize said operating means, and means for holding said switch means in said third position upon operation of said operated means thereby to maintain said operated means energized.

17. In a control apparatus for a heating system, an electrically operated heat supplying means, temperature responsive means sensitive to the output of said operated means, a switch means having three positions of operation and moved by said sensitive means from one of said positions to a second of said positions, power means for moving said switch means from said second position to a third of said positions and energized upon movement of said switch means to said second position, said switch means being operable upon movement to said third position to deenergize said power means and energize said operated means, means for moving said switch means to said first position subsequent to movement thereof to said third position to deenergize said operating means, means establishing a predetermined time delay for actuation of said last-named means, and means for holding said switch means in said third position upon operation of said operated means within said predetermined delay thereby to maintain said operated means energized.

18. In a control apparatus for a heating system, an electrically operated heat supplying means, temperature responsive means sensitive to the output of said operated means, a second temperature responsive means sensitive to the output of said operated means, a switch means having three positions of operation and moved by said first-named sensitive means from one of said positions to a second of said positions, power means for moving said switch means from said second position to a third of said positions and energized upon movement of said switch means to said second position, said switch means being operable upon movement to said third position to deenergize said power means and to energize said operated means, means for moving said switch means to said first position subsequent to movement thereof to said third position to deenergize said operated means, means establishing a predetermined time delay for actuation of said last-named means, means for adjusting said predetermined delay to insure that said operated means has had an opportunity to affect said second sensitive means, and means operable by said second sensitive means for holding said switch means in said third position upon operation of said operated means within said predetermined delay thereby to maintain said operated means energized.

19. In a burner control apparatus, a motor, a switch controlling said motor, energizable means for moving said switch to closed position to energize said motor to start operation of the burner, means for deenergizing said means substantially with closure of said switch, means for moving said switch to open position to deenergize said motor to stop operation of the burner, means acting on said energizable means and determining a predetermined elapsed time subsequent to operation of said first-named means for operation of said third-named means, and means operable automatically in response to burner operation prior to expiration of said elapsed time to render said third-named means ineffective to open said switch.

20. In a control apparatus, a switch for controlling an electric circuit, a heat motor energizable to move said switch in one direction to control the circuit, means for controlling said heat motor and operable to deenergize said heat motor substantially concurrently with the control of the circuit by said switch, yieldable means exerting a force opposing said heat motor and operable after deenergization of said heat motor to move said switch in the opposite direction to control the circuit, means cooperable with said yieldable means for adjustably determining the elapsed time between the time of closing and opening of said switch, and means operable automatically in response to the occurrence of a given condition of operation during said elapsed time to render said yieldable means ineffective to operate said switch.

21. In a burner control apparatus, a motor controlling the operation of the burner, a switch controlling the operation of said motor, a heat motor operable after being energized to move said switch to closed circuit position, means controlling said heat motor and operable to deenergize said heat motor substantially concurrently with the movement of said switch to closed position, yieldable means exerting a force opposing said heat motor and operable to move said switch to open position, means for regulating the force exerted by said opposing means to correspondingly regulate the elapsed time between the time of closing and the time of opening of said switch, and mechanical means operable automatically in response to burner operation prior to the expiration of said elapsed time to latch said switch in closed circuit position.

22. In a heating apparatus, electrically operated means for controlling combustion, a switch for controlling said electrically operated means, a heat motor for moving said switch to closed position, means controlling said heat motor and operable to deenergize said heat motor substantially concurrently with the movement of said switch to closed position, means responsive to the temperature of the heating apparatus and operable to move into position to hold said switch mechanically in closed circuit position on cooling of said heat motor, means opposing said heat motor and operable to move said switch to open circuit position on cooling of said heat motor, and means for regulating the force exerted by said last-named means to obtain a desired time lapse between closing and opening of said switch so that said responsive means can during said time lapse move into holding relation with said switch.

EARNEST J. DILLMAN.